April 8, 1958 S. T. VARNER 2,830,159
ELECTROLYTIC SWITCH
Filed Sept. 8, 1953
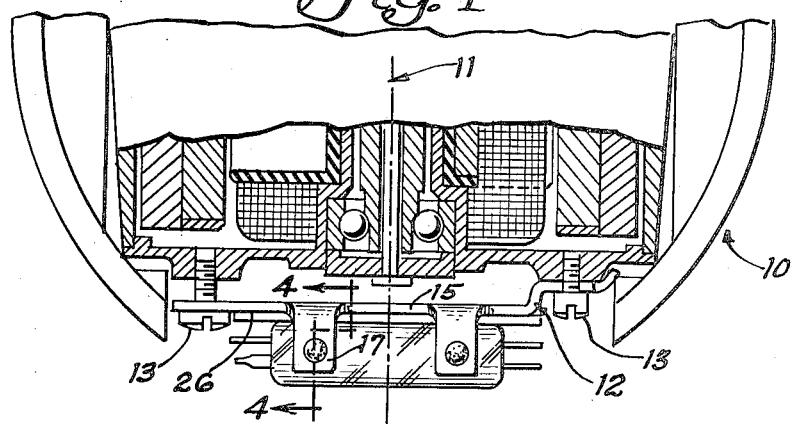
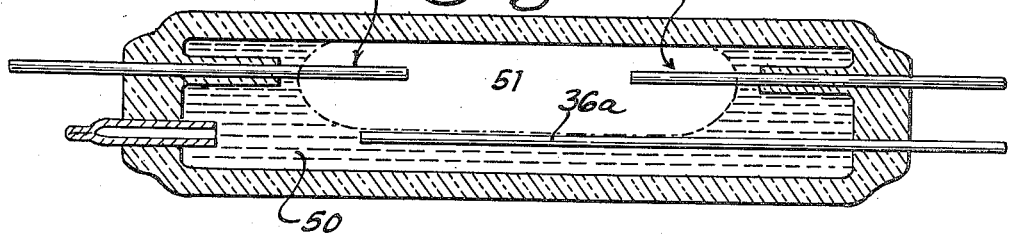
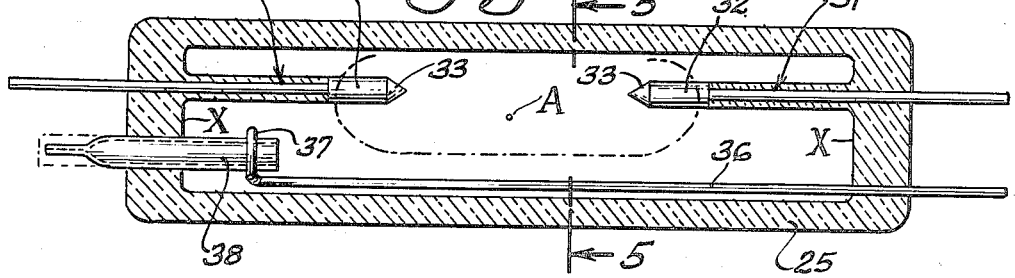
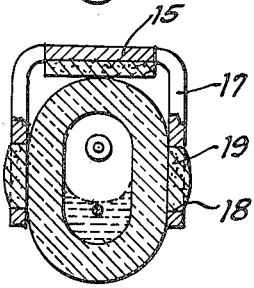 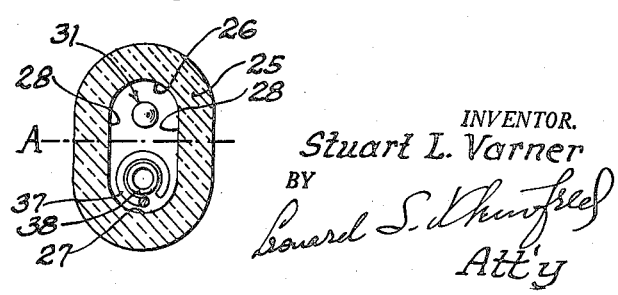
INVENTOR.
Stuart L. Varner
BY
Att'y

United States Patent Office 2,830,159
Patented Apr. 8, 1958

2,830,159

ELECTROLYTIC SWITCH

Stuart L. Varner, Grand Rapids, Mich., assignor to Lear, Incorporated, Grand Rapids, Mich.

Application September 8, 1953, Serial No. 379,027

2 Claims. (Cl. 200—152)

This invention relates to a so-called electrolytic switch of the type wherein conductivity between contacts, viz. electrodes, is varied by selective immersion of the electrodes in a liquid electrolyte. In practice such switches take the form of a tube in which the electrodes are supported in spaced-apart relation and a body of fluid defining a bubble with the interior of the tube is arranged to be moved upon tilting of the tube from a pre-determined norm in order to vary the quantity of electrolyte through which current may flow and thus, by taking advantage of the variable resistance thereof vary the current flow in proportion to the degree of tilt.

Switches of the general character aforesaid have been often employed in connection with a so-called gyro-vertical for sensing departure of the vertical axis of a gyroscope from gravitational vertical. In this connection the switch is a gravity-responsive device referring the instantaneous position of the switch to a control circuit which may then function to correct the position of the gyroscope axis in the proper sense and magnitude.

In particular, where a gyro vertical is utilized in connection with an automatic pilot for controlling the attitude of an airplane in accordance with errors in roll and pitch such gyroscope may be equipped with two switches in accordance with the invention and mounted on the frame of the gyroscope with the longitudinal axis of one switch, viz., of the tube or switch envelope in alignment with the roll axis of the airplane to detect errors in roll. Sometimes both functions have been included in a switch having two pairs of contacts but these have had shortcomings not pertinent here.

With two switches mounted as aforesaid, departure of the vertical axis of the gyroscope from gravitational vertical is sensed by one or both switches, depending upon whether the change in attitude occurs in both roll and pitch or one thereof only, and an error signal is applied through suitable circuitry to torque motors which precess the gyroscope to restore the same to gravitational vertical.

When employed under the foregoing conditions it is important that any errors constitute an irreducible minimum since, in an automatic pilot, malfunction of even the slightest degree may cause the airplane to assume a dangerous attitude, with perhaps very serious consequences. With the present-day rapid transition to higher speed aircraft, e. g. 600 to 700 miles per hour, it is imperative that every component of the automatic pilot perform its function in a virtually errorless manner. For example, and considering the invention switch used for detecting a pitch error, should the airplane be simultaneously executing a rolling and pitching movement, either controlled or uncontrolled, it is important that such rolling movement not influence the information then being imparted by the switch regarding the pitch error, and vice versa. Stated otherwise the "pitch" switch should yield only information regarding displacement in pitch, and the "roll" switch only information regarding displacement in roll.

Heretofore the desideratum last noted has been unattainable. However, an important object of the invention is to fulfill that objective.

Still a further object is to provide a switch as aforesaid in which a greater depth of bubble may be realized and the linear response desirable in a switch of this class almost ideally achieved.

A further object is to provide a tubular electrolytic switch which is provided with a substantially oval, interior, transverse cross section in order to allow free movement of the fluid past the bubble as the switch is tilted.

Other objects will appear from the following description which, taken together with the appended drawings, discloses a preferred mode of carrying the invention into practice.

In this drawing:

Fig. 1 is a partial, side elevational view of a gyroscope showing one of the switches of the invention mounted thereon;

Fig. 2 shows a longitudinal, vertical median cross section of one form of the switch of the invention;

Fig. 3 shows a similar section through another form of the switch;

Fig. 4 is a transverse cross section taken on the line 4—4 of Fig. 1; and

Fig. 5 is a transverse cross section taken on the line 5—5 of Fig. 3.

While the invention is capable of use in many different environments it is, for purposes of illustration, desirable to describe the same in connection with a device with which it may be associated. Exemplificatively, therefore, I have, in Fig. 1, shown a gyroscope 10 of a well-known type, having an axis 11 which, in a null position, is vertical with reference to gravity and subject to displacement with reference to gravity by virtue of disturbing forces, e. g. precessive effects of an airplane to which the gyroscope is referred, as in an automatic pilot apparatus, and must therefore be restored to vertical by means of torquers (not shown). In general two such switches are employed mutually perpendicularly are employed: one with its longitudinal axis aligned with the pitch axis of the airplane, and the other with its axis aligned with the roll axis of the airplane. For clarity only one is shown and is mounted through the medium of a bracket 12 and screws 13—13 to the frame of the gyroscope. It will be understood that the other will have its axis perpendicularly thereto. The particular form of bracket constitutes no part of the invention per se. However, the one shown comprises a body portion 15 sufficiently rigid to maintain its configuration and position under the vibration forces inherent in the airplane and the components carried thereby. One end of the bracket is held fast to the gyroscope frame, and the opposite end, e. g. 26, is arranged for adjustable movement through its associated screw 13 for initial positioning of the switch with respect to the gyroscope axis, so that when the response of the circuit of which the switch forms a part is null, then the gyroscope is truly vertical.

Various means may be availed of for attaching the switch proper to the bracket 12. I have shown depending lugs 17 embracing the glass switch envelope (Fig. 4) and having apertures 18 for receiving cement 19 to secure the switch without the necessity of clamps, straps or other expedients which may place the glass envelope of the switch under a strain and possible fracture.

As embodied in a preferred form the switch proper is shown in Fig. 3, and includes an elongated, tubular envelope of glass or other suitable material 25 having a transverse cross section over its effective length which is best described as flat oval, and which comprises upper and lower semi-cylindrical wall portions 26 and 27 conjoined by flat lateral wall sections 28—28. Alternatively, this contour may be elliptical or of other form wherein the major axis or dimension is disposed vertically and the minor axis disposed horizontally. In the switch illustrated, designed for a gyroscope application, the dimension between the end surfaces X and X is 15/16 inches, the widthwise dimension between surfaces 28 and 28 is 1/8 inch and between the surfaces 26 and 27 is 1/4 inch. Such dimensions are exemplificative only, and may be varied in accordance with the circumstances.

Fused into the opposite end walls of the envelope 25 is a pair of electrodes 31—31, preferably positioned on the axis of the surface 26 and including an exposed portion 32 comprising a cylinder terminating in a conical end 33 having an apical angle of 60°. The total length of the cylinder and cone is 13/64 inch with a diameter of 3/64 inch and the distance between said apices is 3/8 inch. Each of the electrodes 31—31 sense one or the other direction of tilt of the switch about an axis normal to the plane including the axis of the semi-cylindrical surfaces 26 and 27 depending upon the extent of immersion of the electrodes in the electrolyte.

A common electrode 36 of 0.025 inch diameter is fused into the right hand end wall and extends nearly to the opposite end of the switch whereat it is supported by means of a loop 37 about a tube 38. The spacing between the axes of the electrodes 31—31 on the one hand and the electrode 36 on the other is 5/32 inch. If desired the common electrode may be of semi-cylindrical shell form or other transverse cross section. The semi-cylindrical section has been found to possess some advantages and is preferably located with its open side confronting the electrodes 31—31.

In order to supply the switch with the proper measure of the electrolytic fluid 50, the tube 38 is fused into the left end wall and, after being utilized in the manner to be described, is pinched off, as shown, and sealed by welding or otherwise. All of the electrodes and the filler tube are of material which is inert to the electrolyte, e. g. 5% to 10% iridium-platinum.

The electrolyte is one which must remain comparatively unaffected by variation of temperature, is inert to the electrode material and the glass, and does not change in its electrical characteristics over an extended period of use. A preferred composition is disclosed in the commonly owned co-pending application of John F. Schoeppel et al., S. N. 271,976, filed February 16, 1952, now Patent No. 2,764,653. Such quantity of electrolyte 50 is supplied through the tube 38, by the use of a syringe or other suitable implement, as will allow the formation of a bubble 51 which, when displaced from the normal position shown by tilting of the switch will cause a greater or lesser immersion of the electrodes 31—31 in the electrolyte and a differential variation in conduction between these electrodes and the common electrode 36. The critical bubble size may be established readily by connecting the switch in an analog circuit and measuring the effect thereof on meters while the electrolyte is added gradually.

Capillary action causes the formation of a meniscus as seen in Figs. 3 and 4, the bubble size being approximately of the shape shown with the lower boundary thereof just above the electrode 36. In a switch having the proportions previously indicated the bubble will be approximately half the depth of the tube and will assume an approximately circular cross section. Below the bubble approximately one half of the depth of the envelope is taken up by fluid which allows unrestricted movement of the fluid as the bubble is displaced from one end to the other.

The invention switch is characterized by relative immunity to errors in output when rotation is encountered about the longitudinal axis of the envelope say ±90° from vertical. Such desirable result also is achieved by the flat oval cross section which permits no significant change in the position of the fluid surrounding the electrodes when motion is imparted to the switch about its longitudinal axis, since the electrodes 31—31 are substantially aligned with the longitudinal axis of the bubble.

Fig. 2 shows an alternative form of switch in which the electrodes 31a—31a and the common electrode 36a are of considerably simplified construction in order to reduce the cost of manufacture. However, in general, the function is as already described.

From the foregoing it will have been comprehended that I have provided an encapsulated electrolyte switch for detecting the magnitude and direction of departure of the longitudinal axis thereof from a predetermined zero position and which is reliable, sensitive to displacement on its intended axis but insensitive to departure about irrelevant axes.

Moreover, I have found that when the switch is operated about its proper transverse axis the change in voltage in the associated circuit bears a substantially linear relation to the tilt in degrees.

While I have shown particular embodiments of my invention, it will be understood, of course, that I do not wish to be limited thereto since many modifications may be made, and I therefore contemplate by the appended claims to cover any such modifications as fall within the true spirit and scope of my invention.

I claim:

1. An electrolytic switch of the class described comprising an elongated envelope for confining a volume of liquid electrolyte defining with the interior of the envelope a substantially ellipsoidal bubble which is mobile longitudinally of the envelope as the switch is tilted in either direction about an axis perpendicular to the longitudinal vertical mid-hyphen plane of the envelope, a pair of electrodes differentially immersible in said electrolyte as the switch is tilted, said electrodes being substantially coaxial with the major axis of the bubble when the switch is undeflected, a common electrode continuously immersed in said electrolyte, said bubble being displaced in one direction or the other in correspondence with deflection of the switch to vary differentially the respective conductive paths between the first electrodes and the common electrode, said envelope having a transverse, flat oval cross-section over its working range, and the volume of said electrolyte being proportioned to the volumetric capacity of the envelope in accordance with the surface tension of said electrolyte and the cross-sectional configuration of the envelope to provide a transverse cross-section for the bubble substantially equal to the transverse cross-section of the electrolyte taken in the plane whereat said cross-sections are maximum.

2. An electrolytic switch of the class described comprising a tubular envelope of substantially flat oval transverse cross-section, said cross-section being uniform over the working range of the switch and the longer axis of the oval being vertical when the switch is undeflected, a liquid electrolyte in said envelope present in such volume as to define with the envelope a substantially ellipsoidal bubble having its major axis parallel to the longitudinal axis of the envelope, a pair of elongated electrodes one at each end of the envelope respectively extending inwardly thereof and adapted for differential immersion in the electrolyte as the switch is tilted about an axis transverse to a plane including said longer axis and longitudinal axis, said electrodes being substantially coaxial with the major axis of the bubble, a common electrode in said envelope continuously immersed in said electrolyte in all working positions of the switch, all said electrodes lying in said plane.

References Cited in the file of this patent

UNITED STATES PATENTS

| | | |
|---|---|---|
| 1,598,876 | Phelan et al. | Sept. 7, 1926 |
| 1,614,774 | Bonine | Jan. 18, 1927 |
| 2,338,811 | Hasbrook | Jan. 11, 1944 |
| 2,367,465 | Kunzer | Jan. 16, 1945 |
| 2,446,180 | Haskins | Aug. 3, 1948 |
| 2,713,726 | Dixon | July 26, 1955 |
| 2,713,727 | Balsam | July 26, 1955 |